May 18, 1965 H. E. JONES 3,184,241

MANUAL RECORD PLAYER

Filed Aug. 13, 1962 2 Sheets-Sheet 1

INVENTOR.

HOMER E. JONES

BY C. E. Stratton

ATTORNEY

May 18, 1965 H. E. JONES 3,184,241

MANUAL RECORD PLAYER

Filed Aug. 13, 1962

2 Sheets-Sheet 2

INVENTOR.
HOMER E. JONES
BY C. G. Stratton
ATTORNEY

United States Patent Office 3,184,241
Patented May 18, 1965

3,184,241
MANUAL RECORD PLAYER
Homer E. Jones, Los Angeles, Calif., assignor to Violet Beverly May Jones, Los Angeles, Calif.
Filed Aug. 13, 1962, Ser. No. 216,531
2 Claims. (Cl. 274—14)

This invention relates to a record player and has for an object to provide a device in which the record is rotated manually, the invention being characterized by its simplicity of construction and operation for use in backward areas for teaching purposes, as well as a toy that is entertaining, durable, and capable of being kept in useful condition by a child and others of little mechanical skill.

Another object of the invention is to provide a record player that produces direct vibration of a sound-reproducing diaphragm according to the track in the record.

A further object of the invention is to provide a manually-operated record player that may be manually set or adjusted to reproduce the sound of a selected track of a plurality of tracks in a record.

A still further object of the invention is to provide a record player in which the sound-reproducing speaker slides under mechanical power created by the interengagement of the record track and the reproducing needle engaged in said track.

This invention also has for its objects to provide such means that are positive in operation, convenient in use, easily installed in a working position and easily disconnected therefrom, economical of manufacture, relatively simple, and of general superiority and serviceability.

The invention also comprises novel details of construction and novel combinations and arrangements of parts, which will more fully appear in the course of the following description, and which is based on the accompanying drawings. However, said drawings merely show, and the following description merely describes, one embodiment of the present invention, which is given by way of illustration or example only.

In the drawings, like reference characters designate similar parts in the several views.

Figures 1, 2:
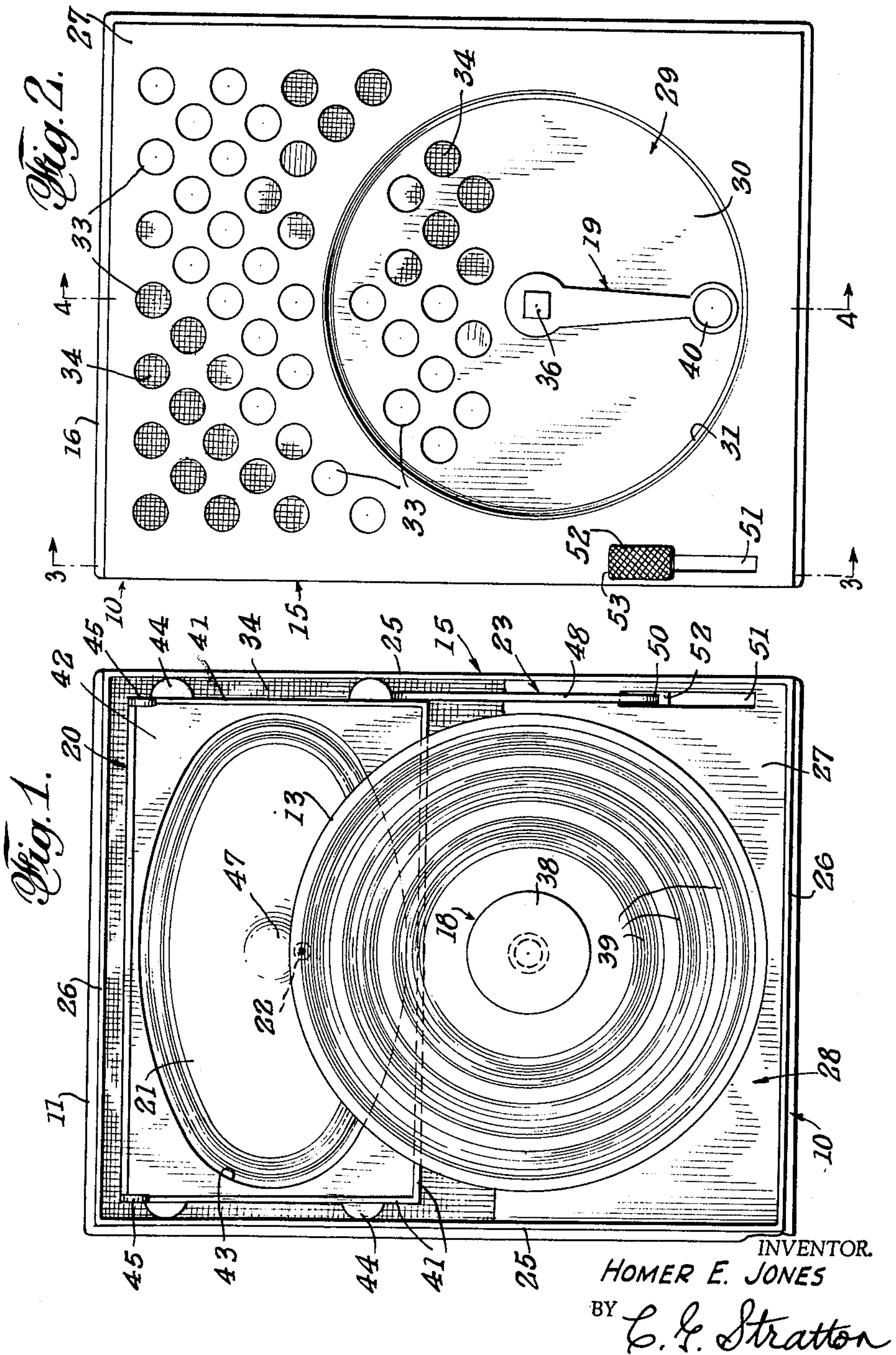
FIG. 1 is a bottom plan view of a record player according to the present invention.
FIG. 2 is a top plan view thereof.
Figures 3, 4, 5:
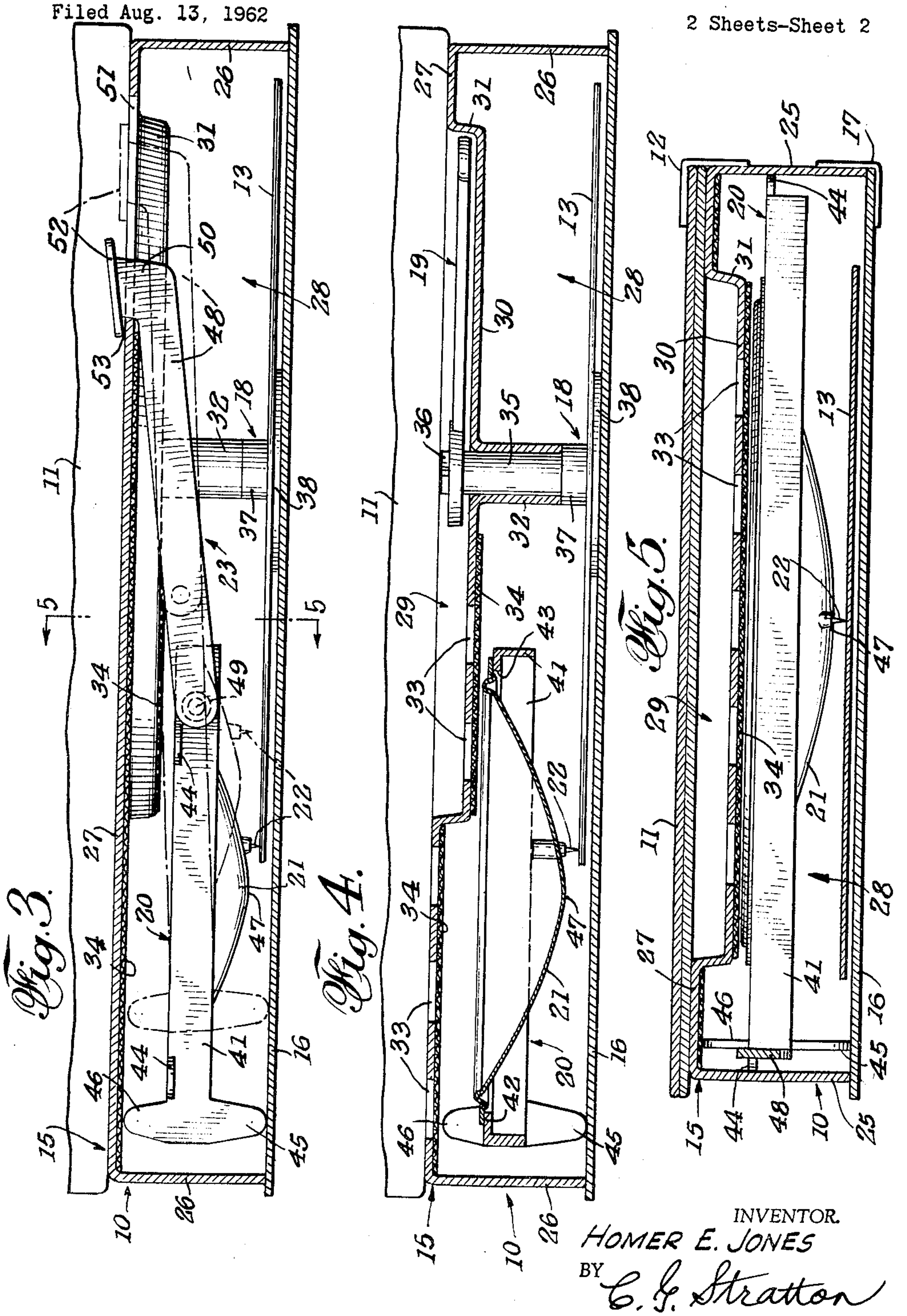

FIGS. 3 and 4 are enlarged longitudinal sectional views as taken on the respective lines 3—3 and 4—4 of FIG. 2.

FIG. 5 is a cross-sectional view as taken on the line 5—5 of FIG. 3.

The record player 10 that is illustrated is shown in connection with a book, folder, or other indicia- and instruction-bearing panels, leaves or sheets 11, a hinge 12 of any suitable design being shown to connect said book to the player 10 to cover the top of the latter or expose said top, when opened out. In the latter condition, said book may be consulted in connection with the recording on a disc record 13 within the player 10.

The record player 10 comprises, generally, a case 15, a bottom cover 16 preferably connected to the case by a hinge 17 for ready access to the interior, although said cover may be secured to the case in other and more permanent ways, a spindle 18 connected to the record 13 on the axis of which said record turns, a crank 19 to rotate the spindle and, therefore, the record, a slide 20 within the case 15, a speaker cone 21 carried by the slide and provided with a needle 22 that is engaged with the track or groove, or one of the tracks or grooves, of the record, if more than one record track is provided, and means 23 for raising the needle 22 out of the record track and adjustable to adjustably shift the slide 20 for setting the needle into a chosen record track.

The player case 15 is preferably rectangular, as in FIGS. 1 and 2, being formed to have side walls 25, end walls 26, and a top wall 27, thereby forming a rectangular interior space 28. At one end of the wall 27 is provided a circular depression 29 that is defined by a bottom wall 30 and a circular wall 31. A tubular bearing 32 is provided at the center of the depressed wall, the same extending toward the open bottom of the case.

As best seen in FIGS. 2 and 4, the walls 27 and 30 are provided with a plurality of holes 33 and the under faces of said walls 27 and 30 are provided with porous fabric liners 34 through which sound, produced in the interior space 28, may pass outward through said holes 33.

The spindle 18 is shown as an axle portion 35 that extends through the bearing 32, a polygonal end 36 extending from the portion 35 into the depression 29, a spacer portion 37 on the opposite end of the portion 35, and a flange 38 on the end of portion 37. The disc record 13 is disposed on said flange, being tightly fitted on the spaced portion 37, the spindle flange 38 resting on the inner face of the cover 16. In this manner, rotation of the spindle results in rotation of the record disc. The latter is of usual design, having track grooves 39 either only on the side directed toward the interior of the case, or on both sides. In the latter case, the record, although having a tight fit on the spindle, is capable of being inverted so that the recording tracks of either side of the record may be reproduced as sound emanating frrom the interior of the case 15.

The crank 19 (FIGS. 2 and 4) is removably connected to the end 36 of the spindle and is rotational in the depression 29 by means of a finger entered in the apertured end 40 of the crank. The crank may be slipped off the spindle end 36 when replacement of a record is desired, in a manner that requires no further description.

The slide 20 is shown as a rectangular member provided with frame walls 41 and a top wall 42 in which is formed an oval opening 43. Two opposite ends of said slide are provided with guide lugs 44 which are directed to have a loose sliding fit against the inner faces of the case walls 25. As best seen in FIG. 1, the slide 20 extends crosswise of the frame with its width as indicated above, and having a length somewhat less than half the length of the case and at least substantially less than the distance between the bearing 32 and the farther end wall 26, as may be seen in FIGS. 4 and 5. Thus, said slide is capable of sliding movement from a position adjacent said farther end wall 26 and a position nearer the bearing 32, as indicated by the dot-dash lines of FIG. 3.

At the end of the slide 20, nearer the case wall 26 above mentioned, are provided, at each side, support lugs 45 which, as seen in FIGS. 3, 4 and 5, ride on the inner face of the bottom cover 16. Similar oppositely directed lugs 46 extend from said slide toward the inner side of the case wall 27 and clear thereof.

The speaker cone 21, as shown, is of oval form and is so affixed to the slide 20 as to have its apex 47 directed toward the cover 16. FIG. 1 shows that the speaker cone conforms in shape to the oval opening 43 in the slide. Offset from said apex in a direction toward the bearing 32, is provided the needle 22, the same being affixed to the cone in such manner that vibration thereof will cause sound-producing resonant vibration of the cover 21.

FIGS. 3 and 4 show how the needle 22 engages the record 13 so as to track in the grooves 39 thereof. It will be clear that lugs 45 and the needle constitute a three-point support for the slide 20 and that, as the needle is drawn inwardly toward the bearing 32 by the groove in which it tracks, the slide moves in that direction on its support lugs 45.

The means 23 is shown as a lift lever 48 connected by a pivot 49 to one side of the slide 20 at the end of said slide that is remote from the support lugs 45. Said lever 48 is provided with an end 50 that protrudes through a slot 51 in the case wall 27, and a pad 52 is provided on said protruding end. Said pad is disposed at an angle, as in FIG. 3, with its lower end 53 resting on the upper face of the case wall 27 and constituting a fulcrum that enables the lever 48 to pivot to bring the needle 22 of the speaker cone to rest upon the record 13.

During normal playing of the record, the lever 49 slides as the slide 20 moves, as above described. When it is desired to manually shift the slide 20 to bring the needle 22 into playing engagement with a selected track 39, the high end of the pad 52 is pressed down, causing the arm 48 to swing in a direction to tip the slide 20, as shown by the dot-dash lines of FIG. 3, and raise the needle 22 away from the record. Now, by shifting the pad along the slot 51, the slide is shifted accordingly, to the new desired position.

While the foregoing has illustrated and described what is now contemplated to be the best mode of carrying out the invention, the construction is, of course, subject to modification without departing from the spirit and scope of the invention. Therefore, it is not desired to restrict the invention to the particular form of construction illustrated and described, but to cover all modifications that may fall within the scope of the appended claims.

Having thus described the invention, what is claimed and desired to be secured by Letters Patent is:

1. A record player comprising
(*a*) a case provided with a removable cover,
(*b*) a spindle journaled in said case to mount a disc record and provided with a hand crank for rotating the spindle and the record,
(*c*) a slide guided in said case to move freely toward and from the journal,
(*d*) means on the slide engaged with the cover thereof to support one end of the slide,
(*e*) a cone speaker carried by the slide and provided with a needle engaged in the sound track of the record and constituting a support for the opposite end of the slide, and
(*f*) manual means to raise the latter end of the slide to lift the needle off the record and to manually shift the slide to bring said needle into position to engage another part of the sound track upon manual release of said means from slide-raising position, which comprises: (1) a lever hingedly connected to the mentioned opposite end of the slide and protruding through a slot in the case, and (2) a pad on said protruding end of the lever disposed at an angle to the case, the lower end of said pad being in fulcrum engagement with the case, whereby pressure on the pad swings the lever on said fulcrum and causes lifting of the slide as aforementioned.

2. In a record player,
(*a*) a case mounting a disc record therein, and being provided with a top wall having a slot therein,
(*b*) a slide having one end in supporting engagement with the case,
(*c*) a speaker cone carried by the slide and provided with a needle in support and operative engagement with the sound groove of said record, and
(*d*) means connected to the opposite end of the slide to both manually raise the latter end of the slide to lift the needle from the record groove and to shift said slide to move the needle to a different groove-engaging position, said means comprising (1) a lever pivotally connected to the slide and protruding through said slot in the case, and (2) a pad on the protruding end of the lever normally disposed at an angle to said case wall, and the lower end of said pad being in fulcrum engagement with the top face of said wall, whereby upon manual depression of the higher end of the pad the lever tilts on said fulcrum to raise the slide and free the same for movement upon manual manipulation of said pad.

References Cited by the Examiner

UNITED STATES PATENTS

| | | | |
|---|---|---|---|
| 637,197 | 11/99 | Berliner | 274—9 |
| 1,655,510 | 1/28 | Runyan | 274—1 |
| 2,316,174 | 4/43 | Kurzen | 274—2 |
| 2,676,808 | 4/54 | Masterson | 274—23 |
| 3,030,114 | 4/62 | Jauquet | 274—15 |

NORTON ANSHER, *Primary Examiner.*